(12) United States Patent
Dahlheimer et al.

(10) Patent No.: US 10,507,595 B2
(45) Date of Patent: Dec. 17, 2019

(54) EXTRUSION HEAD HAVING A PERFORATED PLATE OF A GRANULATING SYSTEM

(71) Applicant: MAAG AUTOMATIK GMBH, Grossostheim (DE)

(72) Inventors: Stefan Dahlheimer, Kleinostheim (DE); Helmuth Meidhof, Grossostheim (DE); Thomas Braun, Grossostheim (DE)

(73) Assignee: MAAG Automatik GmbH, Grossostheim (DE)

( * ) Notice: Subject to any disclaimer, the term of this patent is extended or adjusted under 35 U.S.C. 154(b) by 768 days.

(21) Appl. No.: 14/943,952

(22) Filed: Nov. 17, 2015

(65) Prior Publication Data

US 2016/0082620 A1 Mar. 24, 2016

Related U.S. Application Data

(63) Continuation of application No. PCT/EP2014/001318, filed on May 15, 2014.

(30) Foreign Application Priority Data

May 17, 2013 (DE) ........................ 10 2013 008566.7
May 15, 2014 (WO) ................. PCT/EP2014/001318

(51) Int. Cl.
*B29B 9/06* (2006.01)
*B29C 47/30* (2006.01)
(Continued)

(52) U.S. Cl.
CPC ................ *B29B 9/065* (2013.01); *B29B 9/06* (2013.01); *B29C 48/2562* (2019.02);
(Continued)

(58) Field of Classification Search
CPC ........... B29B 9/06; B29B 9/065; B29C 48/04; B29C 48/0022; B29C 48/2562;
(Continued)

(56) References Cited

U.S. PATENT DOCUMENTS 3,271,821 A * 9/1966 Street ...................... B29B 9/065
425/313
3,867,082 A * 2/1975 Lambertus .............. B29B 9/065
425/313
(Continued)

FOREIGN PATENT DOCUMENTS

| DE | 10002408 A1 | 7/2001 |
| DE | 20214743 U1 | 3/2003 |
| EP | 2110218 A1 | 10/2009 |

*Primary Examiner* — Joseph S Del Sole
*Assistant Examiner* — Joseph S Leyson
(74) *Attorney, Agent, or Firm* — Rao DeBoer Osterrieder, PLLC; Dileep P. Rao

(57) ABSTRACT

An extrusion head having a perforated plate of a granulating system. The extrusion head can have a head part and a perforated plate with a perforated-plate wear insert, a perforated-plate main body, a central inflow cone, an inflow cone part, a plurality of nozzle channels, a plurality of perforated dies, and at least one corrosion protected fastener. The perforated-plate can be detachably fastened to the head part. The head part can have at least one central melt channel into which the inflow cone part projects and distributes a melt flow among nozzle channels which can be arranged in the shape of a ring and among the perforated dies which can be arranged in at least one ring. The at least one fastener can be positioned in a central region of the at least one ring of the perforated dies.

17 Claims, 6 Drawing Sheets

(51) Int. Cl.
*B29C 48/30* (2019.01)
*B29C 48/345* (2019.01)
*B29C 48/25* (2019.01)
B29C 48/88 (2019.01)
B29C 48/04 (2019.01)
B29C 48/00 (2019.01)

(52) U.S. Cl.
CPC .... *B29C 48/2566* (2019.02); *B29C 48/25686* (2019.02); *B29C 48/30* (2019.02); *B29C 48/345* (2019.02); *B29C 48/0022* (2019.02); *B29C 48/04* (2019.02); *B29C 48/3003* (2019.02); *B29C 48/919* (2019.02); *B29C 2793/0027* (2013.01); *B29K 2905/10* (2013.01); *B29K 2905/12* (2013.01); *B29K 2909/02* (2013.01); *B29K 2909/04* (2013.01)

(58) Field of Classification Search
CPC .......... B29C 48/2566; B29C 48/25686; B29C 48/30; B29C 48/3001; B29C 48/3003; B29C 48/345; B29C 48/919
See application file for complete search history.

(56) References Cited

U.S. PATENT DOCUMENTS

| | | | | |
|---|---|---|---|---|
| 4,720,251 | A * | 1/1988 | Mallay | B29B 9/065 165/158 |
| 6,220,847 | B1 * | 4/2001 | Yoshida | B29B 9/065 425/67 |
| 2003/0008026 | A1 * | 1/2003 | Knight | B29B 9/065 425/67 |
| 2005/0035483 | A1 * | 2/2005 | Jackson | B01J 2/20 264/142 |
| 2011/0318440 | A1 * | 12/2011 | Zollitsch | B29B 9/065 425/67 |

* cited by examiner

EXTRUSION HEAD HAVING A PERFORATED PLATE OF A GRANULATING SYSTEM

CROSS REFERENCE TO RELATED APPLICATIONS

The present patent application is a Continuation that claims priority to and the benefit of co-pending International Patent Application No. PCT/EP2014/001318 filed May 15, 2014, entitled "EXTRUSION HEAD HAVING A PERFORATED PLATE OF A GRANULATING SYSTEM", which claims priority to DE Application No. 102013008566.7 filed May 17, 2013. These references are hereby incorporated in their entirety.

FIELD

The present embodiments generally relate to an extrusion head having a perforated plate of a granulating system.

BACKGROUND

The invention relates to an extrusion head having a perforated plate of a granulating system. The extrusion head can have a head part which constitutes the transition to an extrusion device, and a perforated plate with a central inflow cone, nozzle channels, and perforated dies of a perforated plate for the extrusion of granulation strands. The perforated plate with a central inflow cone, nozzle channels, and perforated dies can be detachably fastened to the head part. The head part of the extrusion head can have at least one central melt channel into which the inflow cone of the perforated plate projects and distributes the melt flow among nozzle channels which can be arranged in the shape of at least one ring, and among the adjoining perforated dies of the perforated plate.

Known to persons having ordinary skill in the art is an underwater granulator that has an extrusion head with a head part, a central melt channel, and with a perforated plate of complex construction, as is shown in FIG. 6 attached hereto for the purpose of clarification. The one-piece perforated plate has an inflow cone, nozzle channels, perforated dies, and is subjected to relatively high wear depending on operating conditions since circulating granulator blades sweep in a rotating manner along an outer contact surface with openings of the perforated dies in order to sever granulate strands emerging from the openings into granules. The granules are then discharged from the underwater granulator in a cooling water flow in the direction of the arrow A.

Once such a complex perforated plate reaches the predefined wear limit at the outer contact surface, it along with its integrated inflow cone, integrated nozzle channels, and integrated perforated dies, must be replaced by new perforated plate or recycled, both of which are cost-intensive. Moreover, such a prior art extrusion head experiences accelerated aging due to corrosive attack on screw heads by the cooling water flow. The screw heads of screwed connections, which connect the complex perforated plate to the head part of the extrusion head are unprotected and exposed to the cooling water flow.

One object of the present invention is to delay the aging of extrusion heads and to reduce the maintenance costs, assembly costs, replacement costs, and wear costs of the perforated plates of the extrusion heads, and to reduce the corrosion of component parts.

This object is attained by the present invention.

BRIEF DESCRIPTION OF THE DRAWINGS

The detailed description will be better understood in conjunction with the accompanying drawings as follows.

Figure 1:
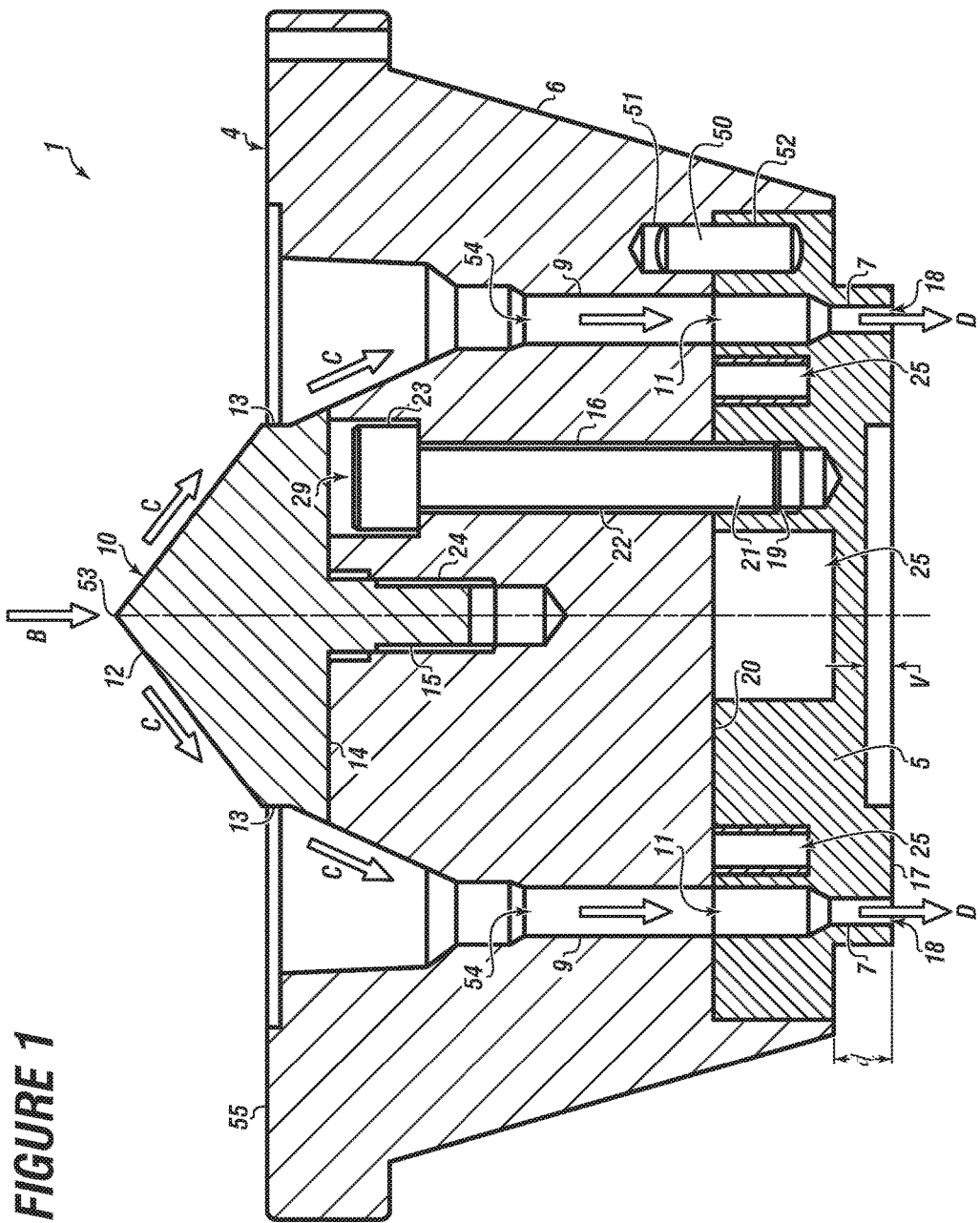
FIG. 1 shows a schematic cross-section through a multi-part perforated plate of an extrusion head according to a first embodiment of the invention.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

Specific structural and functional details disclosed herein are not to be interpreted as limiting, but merely as a basis of the claims and as a representative basis for teaching persons having ordinary skill in the art to variously employ the present invention.

One embodiment of the invention concerns an extrusion head having a perforated plate of a granulating system. The extrusion head can have a head part and a perforated plate with a central inflow cone part, nozzle channels, and perforated dies. The perforated plate can be detachably fastened to the head part. The head part of the extrusion head can have at least one central melt channel, into which the inflow cone part of the perforated plate projects and distributes the melt flow among nozzle channels which can be arranged in the shape of a ring, and among the perforated dies which can be arranged in at least one ring.

The perforated plate can be constructed in multiple parts comprising a perforated-plate wear insert, a perforated-plate main body, and an inflow cone part, and can have a corrosion-protected fastener that detachably holds the multi-part perforated plate together. The fastener can be positioned in a central region of the at least one ring of the perforated dies, and in embodiments, be located in the inner region of the at least one ring of perforated dies.

One advantage of this extrusion head embodiment with head part and multi-part perforated plate mounted thereon is that when a wear limit is reached for the perforated plate as a result of the contact with the rotating granulator blades of a granulator on the exterior surface of the perforated plate, it is only necessary to replace the perforated-plate wear insert, which is attached by a fastener to additional components of the multi-part perforated plate, such as the perforated-plate main body and the inflow part.

The other parts of the perforated plate according to the invention, such as the perforated-plate main body, fastening part, and inflow part, are reusable, especially since the fastener can be positioned in a corrosion-protected manner inside the ring of perforated dies of the perforated-plate wear insert such that the surface of the fastener is not in contact with the cooling water. In this manner, the fastening part can be protected against aging due to corrosion caused by the cooling water.

The perforated-plate main body, which is labor-intensive and cost-intensive to manufacture, and also the inflow cone part can continue to be used. With such a multi-part structure of the perforated plate, the operator has the option of repairing the perforated plate himself relatively easily when wear of the perforated-plate wear insert occurs. A perforated-plate wear insert of this nature is considerably more economical than a recycled perforated plate, let alone a new perforated plate, of conventional design.

Another advantage is that this perforated-plate wear insert is far simpler to manufacture than the complex one-piece perforated plate known from the prior art, since the mechanical processing is simplified and a brazing or soldering of hard metal inserts into the perforated-plate wear insert can take place in shorter process times because of significantly less mass must be heated.

Moreover, various additional modifications in the application of wear coats to an outer contact surface are made possible by the multi-part construction. A variant using round wear sleeves is also advantageously possible. Furthermore, owing to the multi-part construction of the perforated plate according to the invention, the possibility exists of combining different materials for the perforated plate, so that the perforated-plate main body can be constructed of a low alloy iron with high thermal conductivity, and the perforated-plate wear insert can be constructed of a commensurately higher alloyed steel with the lowest possible thermal conductivity, so that the thermal behavior of the perforated plate can be better adapted on the whole to the extreme temperature jump between the temperature of the melt stream delivered and the temperature of the cooling water flow, for example of an underwater granulator, adjacent to the perforated-plate wear insert.

In another embodiment of the invention, the perforated dies can be located wholly within the perforated-plate wear insert. In this design, the openings that are arranged in at least one ring in the outer contact surface can have a smaller diameter than the associated openings in the inner surface of the perforated-plate wear insert. The placement of such perforated dies in the perforated-plate wear insert is simplified as compared to the prior art perforated plate, since both the outer contact surface and the inner surface of the perforated-plate wear insert are freely accessible for mechanical, electrochemical, or laser processing. Consequently, the making of perforated dies arranged in at least one ring in such a perforated-plate wear insert is possible in an economical manner.

In this context, a ring of perforated dies should to be understood to mean not only a circular ring, but rather to also include polygonal rings, including triangular and rectangular ring-shaped arrangements of the perforated dies. The only critical factor is that attachment of the perforated-plate wear insert does not take place with screwed connections located outside of such a ring as known from the prior art, but rather inside the area of the ring.

In addition, the fastener provided for this purpose can be anchored in the perforated-plate wear insert from inside the inner surface of the perforated-plate wear insert. As a result, the material of the perforated-plate wear insert and, in other embodiments of the invention, the material of the perforated-plate main body, protects the fastener against corrosion caused by the cooling water.

In embodiments, a provision is made for the perforated-plate main body to have nozzle channels whose ends on the downstream side are in operative connection with the perforated dies of the perforated-plate wear insert, and wherein the perforated-plate wear insert is detachably fastened to the perforated-plate main body by a fastener from inside the inner surface. For this purpose, the fastener can engage both the perforated-plate main body and the perforated-plate wear insert.

In another embodiment of the invention, the inflow cone part can have a conical lateral surface and a circular base. The fastener can project out of the circular base and through the perforated-plate main body, and is anchored in the perforated-plate wear insert. For this purpose, a specially shaped inflow cone part is necessary that is not connected at its circular base to the main body in a material-to-material manner or integrally, but instead has a pin or stud projecting centrally out of the circular base whose length is sufficient to project through the perforated-plate main body and to be anchored in the perforated-plate wear insert.

To this end, in another embodiment of the invention the inner surface of the perforated-plate wear insert has at least one centrally located, threaded blind hole that engages a threaded stud as the fastener of the inflow cone part. For application of a wrench, indentations or wrench flats can be placed in the conical lateral surface of the inflow cone part so that it is possible to screw together or disassemble the multi-part perforated plate using a suitable wrench with the aid of the inflow cone part.

In an alternative embodiment of the invention, the inner surface of the perforated-plate wear insert can have at least two off-center threaded blind holes into which thread ends of threaded screws project in a detachably securing manner. The screw heads of the at least two threaded screws can be covered by the base of the inflow cone part in this design. A press-fit of the perforated-plate main body on the inner surface of the perforated-plate wear insert can be formed by tightening the at least two threaded screws.

In order to fix the inflow cone part on the perforated-plate main body, the latter additionally can have a central threaded hole in which a central threaded stud of the inflow cone part is in detachable screwed connection. Instead of two threaded screws, it is also possible for three to six threaded screws to be positioned around this central threaded hole of the central threaded stud of the inflow cone part, the screw heads of which are covered by the base of the inflow cone and thus are arranged in a corrosion-protected manner inside the material of the multi-part perforated plate.

Because of the multi-part nature of the perforated plate according to the invention, it is easily possible to introduce thermal insulation cavities into the perforated-plate wear insert adjacent to the perforated dies from the inside of the perforated-plate wear insert. These thermal insulation cavities reduce the contact area between the perforated-plate wear insert and the perforated-plate main body and thereby form a higher heat transmission resistance so that the thermal insulation is improved between the cooling water present at the outer contact surface of the perforated-plate wear insert and the hot melt flow carried in the perforated dies.

Instead of perforated dies arranged in the shape of a ring, in another embodiment of the invention the dies can also be arranged in groups on an annulus, so that the outer contact surface has openings of the perforated dies arranged in groups.

For the purpose of assembling the perforated-plate main body and perforated-plate wear insert, alignment holes can be provided in the inner surface of the perforated-plate wear insert and in opposing locations in a mating face of the perforated-plate main body, with a suitable alignment pin being located in said holes. Such alignment pins can be omitted if the ring-shaped arrangement of the perforated dies has a polygonal ring that mirrors a recess in the perforated-plate main body. Persons having ordinary skill in the art can provide additional useful modes of unambiguous positioning/anti-rotation protection.

In addition, provision is made that the outer contact surface of the perforated-plate wear insert can have a wear-resistant coating preferably made of hard metal, such as tungsten carbide, aluminum oxide, silicon nitride, boron carbide, silicon carbide, or sequences of layers of one or more of these materials. Maintenance and repair intervals can be extended in an economical way by means of such wear-resistant coatings.

It is also possible for the entire perforated-plate wear insert to have a thermally insulating, wear-resistant material, such as high alloy stainless steel with iron nitride precipitates, aluminum oxide, silicon nitride, boron carbide, or silicon carbide. Maintenance and repair intervals can be extended in an economical way by means of such a wear-resistant material. In addition, it is possible to improve the thermal insulation between the outer contact surface, which may be in contact with cooling water, and the perforated plate main body, which carries the hot melt flow.

To incorporate the perforated dies in a perforated-plate wear material of this nature, options can include the electrochemical method already mentioned above and a laser ablation method, with which methods bores having different diameters can be made from the outer contact surface as well as from the inner surface of the perforated-plate wear insert to form perforated dies. On the other hand, it is also possible to install prefabricated perforated die inserts in the perforated-plate wear insert and to join them in a material-to-material manner to the perforated-plate wear material, for example by brazing.

In contrast to the material of the perforated-plate wear insert, it can be advantageous if the perforated-plate main body has a heat-conducting metal, such as aluminum bronze or a low-alloy iron. Such metals are easy to work, and because of the high thermal conductivity can be preheated at the start of the extrusion process for temperature control of the extrusion head. For a heating phase of this nature, additional heating channels can be provided in the material that is easily worked by metal cutting; these channels can be transverse to the nozzle channels.

In another embodiment of the invention, provision can be made for a temperature sensor that contacts the inner surface of the perforated-plate wear insert for temperature measurement, preferably in the region of the nozzle channels, to be located in the perforated-plate main body. Using such temperature sensors, the thermal process window for the extrusion process and for the formation of granules can be narrowed down more precisely. Closed-loop or open loop control of the perforated plate temperature can also usefully be carried out based on the temperature values thus obtained.

A use of an extrusion head of this nature can be provided for granulating systems in which the above-described extrusion head is in operative connection with an extrusion device. Thus a granulating system for granulation strands or underwater granulation can be connected to this extrusion head. In the case of a granulating system with an underwater granulator, its granulator blades can be in rotating operative connection with the stationary outer contact surface of the perforated-plate wear insert and contribute to the wear stress on the perforated-plate wear insert.

The invention is described in detail below with reference to the embodiments explained by way of example.

FIG. 1 shows a schematic cross-section through a multi-part perforated plate of an extrusion head according to a first embodiment of the invention.

The perforated plate 4 in this embodiment comprises three parts: a perforated-plate wear insert 5, a perforated-plate main body 6, and an inflow cone part 10. A flow of melt arriving in the direction of the arrow B can be distributed by the inflow cone part 10 in the direction of the arrow C among nozzle channels 9, which are provided in the perforated-plate main body 6. The inflow cone part 10 can have a conical lateral surface 12 and a circular base 14, out of which projects a fastener such as threaded stud 15 that engages threaded hole 24 of the perforated-plate main body 6. For the purpose of screwing the threaded stud 15 into the threaded hole 24 of the perforated-plate main body 6, indentations 13 can be provided as wrench flats on the conical lateral surface 12 of the inflow cone part 10 to make it possible to apply a wrench.

The perforated-plate wear insert 5 can have openings 18 of perforated dies 7 on its lower outer contact surface 17, from which granulate strands can emerge in the direction of the arrow D. Unlike the illustration, the mounting position of the arrangement shown in FIG. 1 is customarily in the vertical orientation rather than the horizontal orientation shown. The perforated dies 7 can be in operative connection with downstream ends 11 of the nozzle channels 9 of the perforated-plate main body 6.

To make this possible, an inner surface 20 can have corresponding transitions and at least one alignment pin 50, which can be arranged in an alignment hole 52 and project from the inner surface 20 into an alignment hole 51 of the perforated-plate main body 6. It can be ensured with this alignment pin 50 that the transition between the nozzle channels 9 of the perforated-plate main body 6 and the perforated dies 7 of the perforated-plate wear insert 5 is made with a precise fit during assembly of the perforated plate 4 from the inflow cone part 10, perforated-plate main body 6, and perforated-plate wear insert 5.

In order to hold the multi-part perforated plate 4 together, the threaded stud 15 of the inflow cone part 10 can be provided, and in addition a fastener 29 can be provided, which can be implemented by three screwed connections 16 distributed about the circumference of a circle. The screwed connections 16 can have threaded screws 22 whose thread ends 21 are detachably fixed in a threaded blind hole 19 of the perforated-plate wear insert 5, wherein associated screw heads 23 of the threaded screws 22 are covered by the base 14 of the inflow cone part 10.

Consequently, the fastener 29 can be located inside a region of the annularly arranged perforated dies 7 of the perforated-plate wear insert 5, not outside of such a ring of openings 18 of the perforated dies 7 as in the prior art. As a result, the fastener 29 can be completely protected, so that no surface of the fastener 29 comes into contact with the melt or with the cooling water as shown in FIG. 6.

Since at least three such threaded screws 22 can be distributed about the circumference of a fastener circle in this first embodiment, the two additional threaded screws are not depicted in the cutting plane shown here. The material used to fabricate the inflow cone part 10 and the perforated-plate main body 6 can have better thermal conductivity than the perforated-plate wear insert 5, and can be made from a metal such as an aluminum bronze or a low alloy iron.

The perforated-plate wear insert 5 can have a highly wear-resistant material made of a high alloy steel, for example with nitride precipitates in the crystal structure, or of a ceramic material such as aluminum oxide, silicon nitride, boron carbide or silicon carbide. Moreover, thermal insulation cavities 25 can be provided in the perforated-plate wear insert 5 to reduce the heat transmission between the perforated-plate main body 6 and the inner surface 20 of the perforated-plate wear insert 5. In this way, thermal insulation can be improved between the hot melt flow and the cooling water, for example of an underwater granulator, flowing past at the outer contact surface 17 of the perforated-plate wear insert 5.

Figure 6:
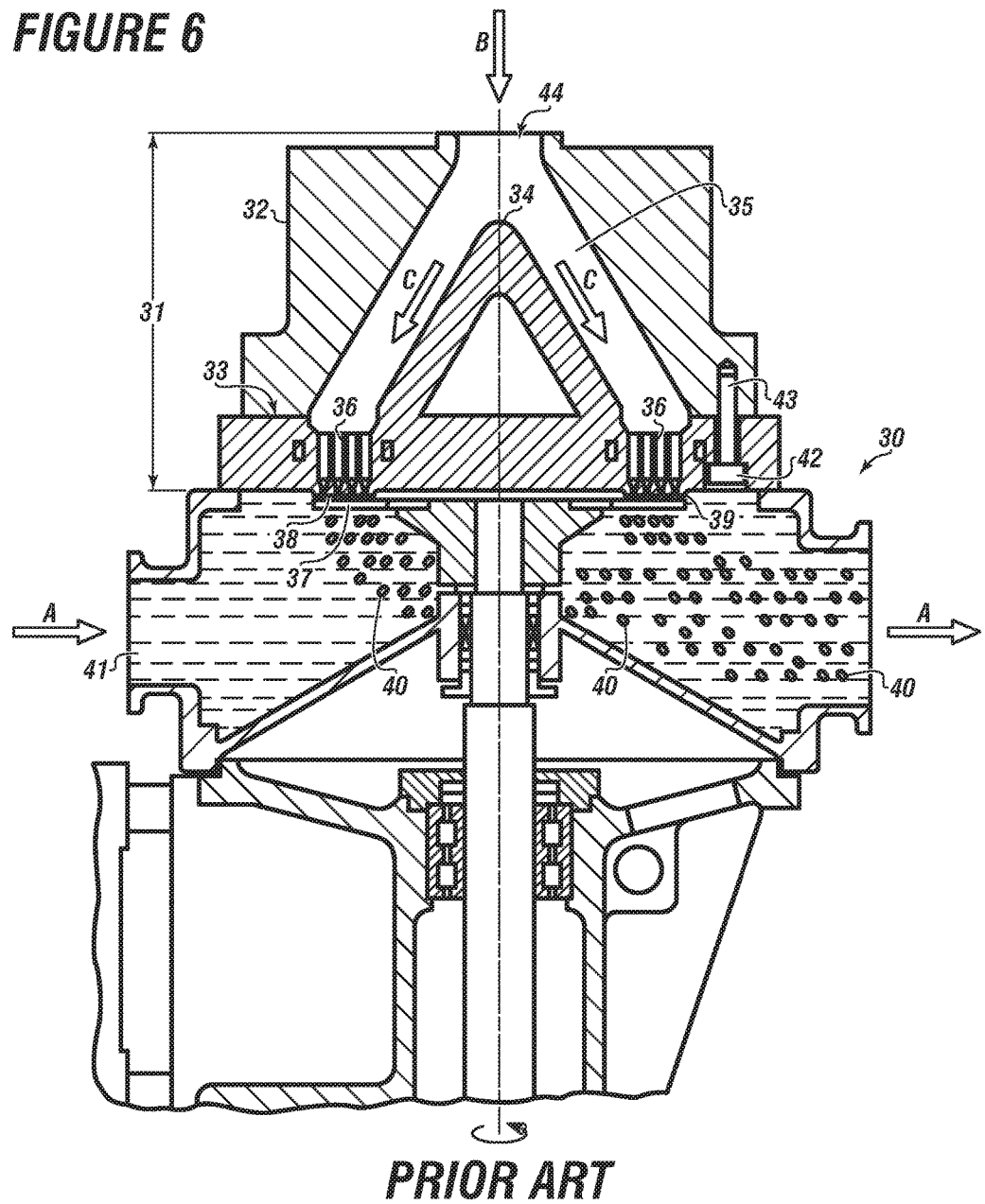
FIG. 6 shows a schematic cross-section through an underwater granulator with extrusion head according to the prior art.

As FIG. 6 shows, in the prior art, granulator blades sweep in a rotating manner over the outer contact surface 17 of the perforated-plate wear insert 5 and sever the granulation strands that are extruded in the direction of the arrow D from the openings 18 to make granules. The openings 18 are located on a disk-shaped platform that projects by a wear thickness v relative to the center of the perforated-plate wear insert 5. Once this wear thickness has been worn away, the wear limit of the perforated-plate wear insert 5 has been reached, and the perforated-plate wear insert 5 should be replaced or reconditioned.

Figure 2:
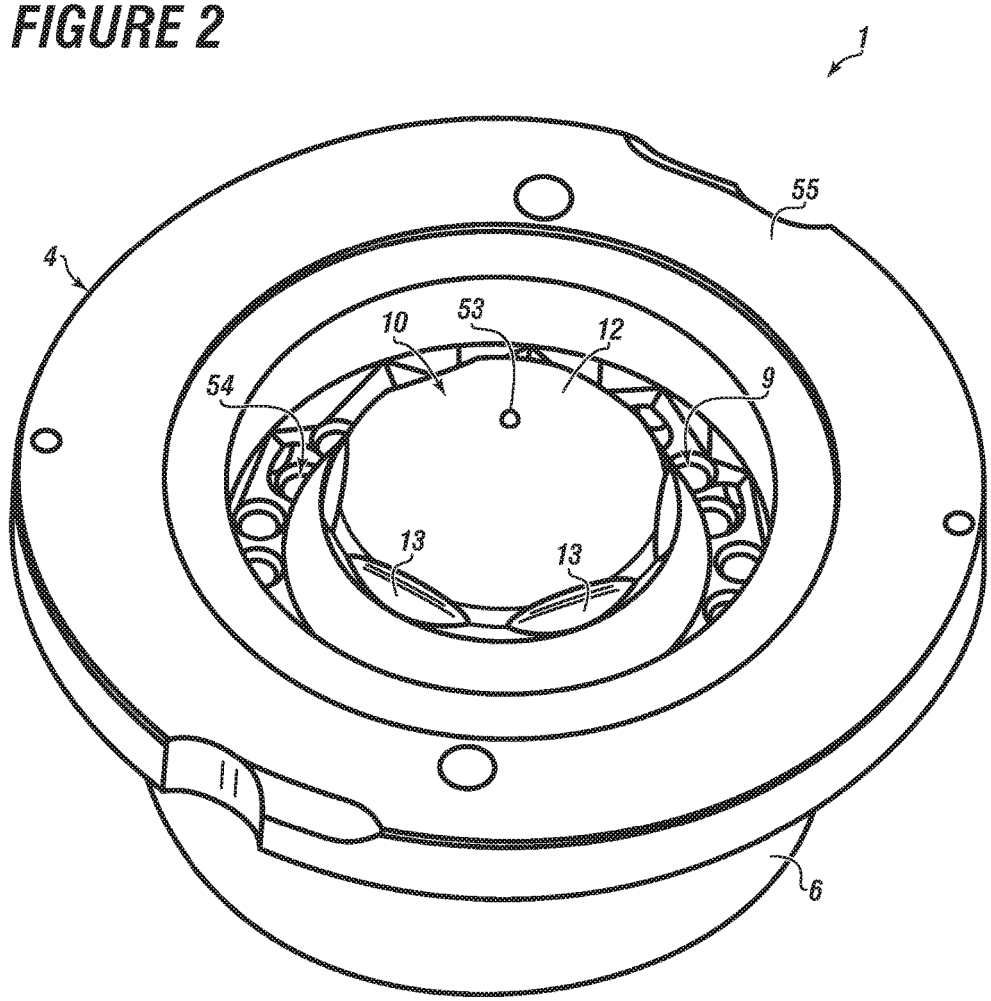
FIG. 2 shows a schematic perspective view of a top of the multi-part perforated plate from FIG. 1.

FIG. 2 shows a schematic perspective view of a top of the multi-part perforated plate from FIG. 1.

Top 55 is oriented vertically, in the customary mounting position of the arrangement. The perforated plate 4 can be connected by the top 55 to a head part of the extrusion head 1—not shown fully here—of a first embodiment of the invention. The apex 53 of the inflow cone part 10, which projects above the top 55 of the perforated plate, becomes visible in this perspective view. In addition, the indentations 13 that can serve as wrench flats for applying a wrench are discernible on the conical lateral surface 12 of the inflow cone part 10. The melt flow is distributed by the inflow cone part 10 among the openings 54 of nozzle channels 9, and delivered through the nozzle channels 9 of the perforated-plate main body 6 to the perforated dies (not visible) of a perforated-plate wear insert.

Figure 3:
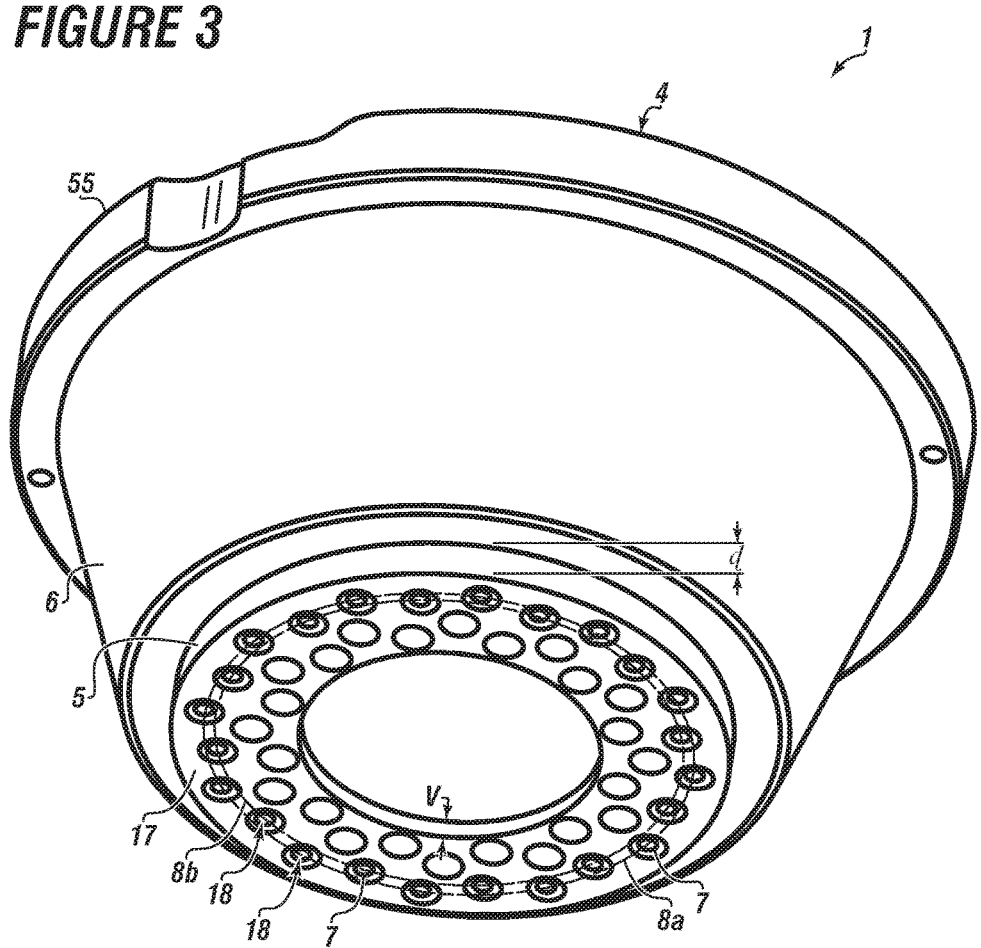
FIG. 3 shows a schematic perspective view of an outer contact surface of the multi-part perforated plate from FIG. 1.

FIG. 3 shows a schematic perspective view of an outer contact surface of the multi-part perforated plate from FIG. 1.

Openings 18 of a first ring 8 of perforated dies are arranged on a larger ring diameter than the offset openings 18b of a second ring 8b with the openings 18b of correspondingly offset perforated dies 7b.

The ring-shaped outer contact surface 17 of the perforated-plate wear insert 5 projects from the perforated-plate main body 6 and as a result can be used to a wear thickness v by the granulator blades as shown in FIG. 6 before it is necessary to replace the perforated-plate wear insert 5. The additional circular rings that are visible in this view adjacent to the openings 18 and 18b are positions of cavities 25 shown in FIG. 1, which are closed with respect to the cooling water in the position shown.

Figure 4:
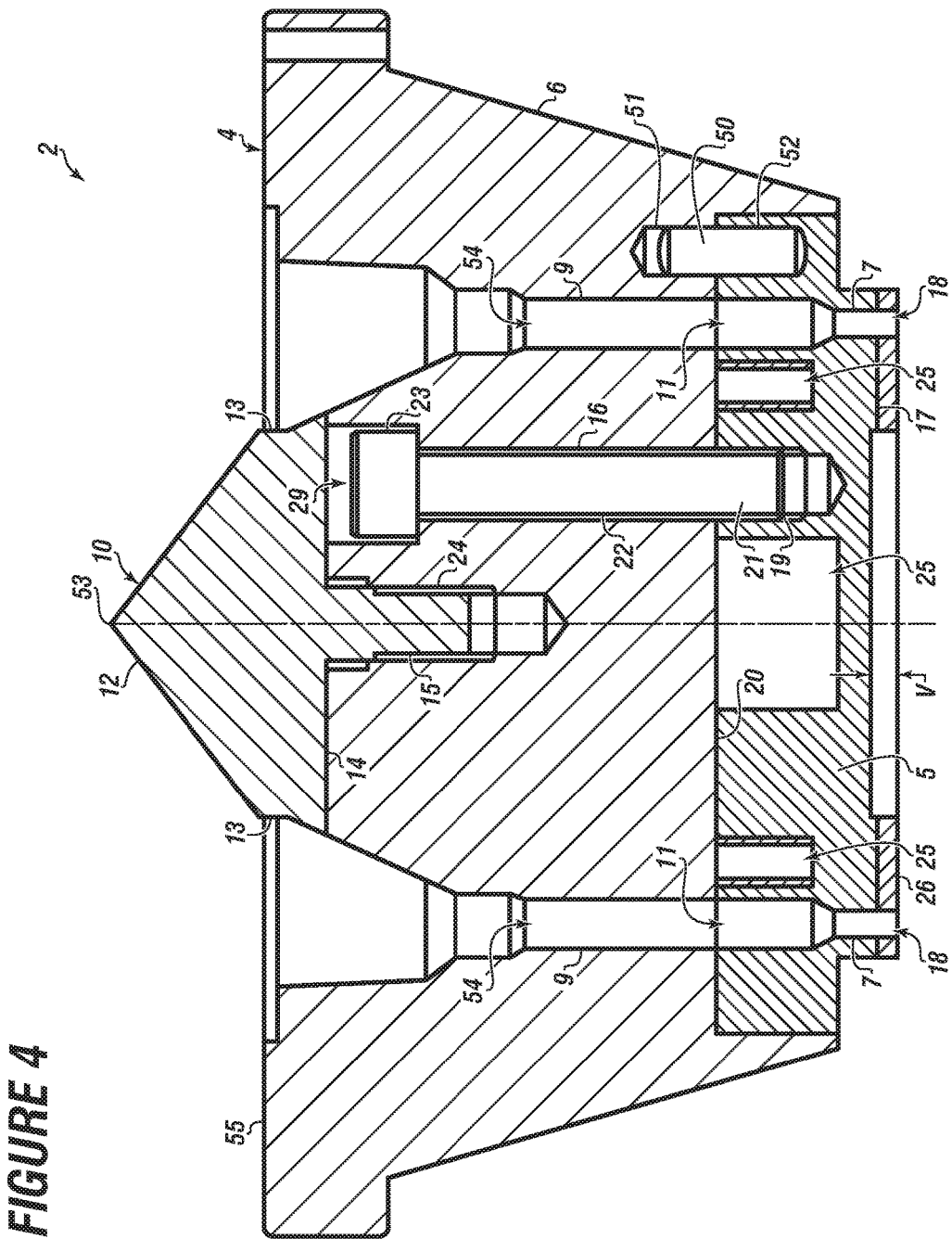
FIG. 4 shows a schematic cross-section through a multi-part perforated plate of an extrusion head according to a second embodiment of the invention.

FIG. 4 shows a schematic cross-section through a multi-part perforated plate of an extrusion head according to a second embodiment of the invention.

Components with the same functions as in the preceding figures are labeled with the same reference numbers, and are not discussed separately.

The difference between the first embodiment of the invention from FIG. 1 and the second embodiment shown here is that the perforated-plate wear insert 5 has, on its outer contact surface 17, a coating 26 made of a wear-resistant material. This wear-resistant material can have one of the group of hard metals, such as tungsten carbide, aluminum oxide, of silicon nitride, boron carbide, silicon carbide, or mixed forms or sequences of layers of these materials so that the wear resistance of the perforated-plate wear insert 5 is further increased and the service life of the perforated plate according to the invention 4 is extended. Chemical deposition methods such as CVD (Chemical Vapor Deposition), physical deposition methods such as PVD (Physical Vapor Deposition), electrochemical deposition methods, or any methods known to persons having ordinary skill in the art can be used to apply such a coating 26. A thermal insulating layer can also be provided in this manner.

Figure 5:
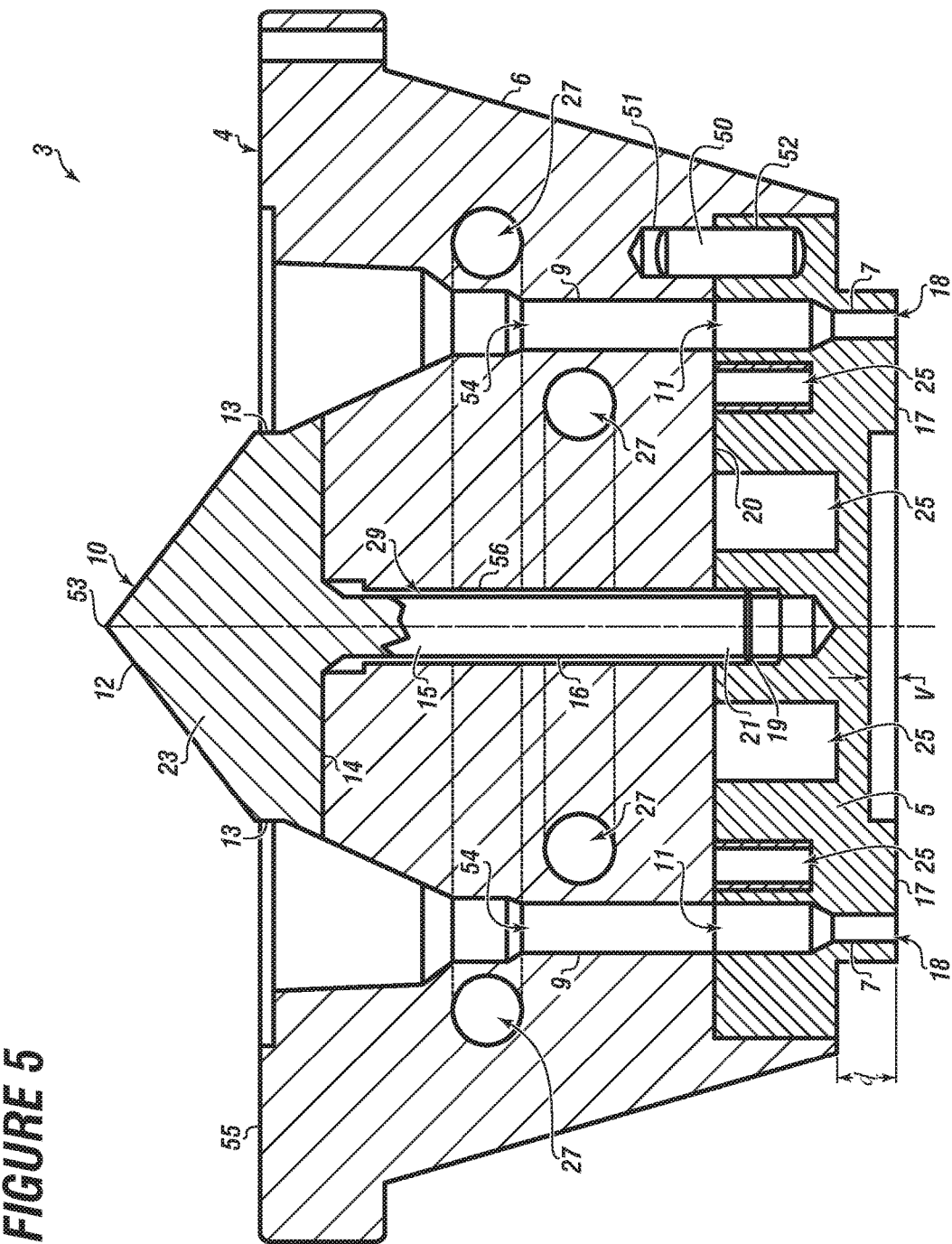
FIG. 5 shows a schematic cross-section through a multi-part perforated plate of an extrusion head according to a third embodiment of the invention.

FIG. 5 shows a schematic cross-section through a multi-part perforated plate of an extrusion head according to a third embodiment of the invention;

The perforated plate 4 of this third embodiment of the invention differs from the preceding perforated plates in that the fastener 29 shown in the preceding figures is composed here of a central fastener that projects out of the circular base 14 of the inflow cone part 10 and extends through the perforated-plate main body 6 in a through hole 56, and stands in engagement at its thread end 21 in a central threaded blind hole 19 in the perforated-plate wear insert 5. The inflow cone part 10 covers the central fastener 29 and, at the same time, forms the screw head 23 of the fastener 29.

Such a central fastener 29 in this embodiment has the smallest space requirement in the perforated-plate main body 6, with just one single central through hole 56.

Furthermore, this is the smallest space requirement to hold the multi-part perforated plate 4 together, with just one single threaded blind hole 19 in the perforated-plate wear insert 5. Such a screwed connection must accommodate the sum of the compressive forces that act on the perforated dies, however.

In addition, FIG. 5 shows the possibility of incorporating heating channels 27 in the perforated-plate main body 6, e.g. in that they are taken into account during casting of the perforated-plate main body 6 or are appropriately milled in during the multi-part construction of the same (not shown). The heating channels can be transverse and located in the vicinity of the nozzle channels 9, in order to heat up the extrusion head 3 in critical regions of the perforated-plate main body 6 in an initial phase of the extrusion process.

In order to ensure alignment of the applicable perforated die 7 with the associated nozzle channel 9, additional anti-rotation protection is useful, for instance by means of an alignment pin 50. Moreover, it is useful if the alignment is ensured of the inflow cone part 10 and the perforated-plate main body 6, for example by the provision of an alignment section of the portion of the inflow cone part 10 that projects into the main body 6, wherein this alignment section should then have a larger diameter than the diameter of the threaded stud 15.

FIG. 6 shows a schematic cross-section through an underwater granulator with extrusion head according to prior art.

Although embodiments that are at least exemplary have been presented in the above specification, it is possible to make various changes and modifications. The said embodiments are merely examples and are not provided for the purpose of limiting in any way the scope of validity, the applicability, or the configuration of the extrusion head. It is rather the case that the above specification offers to the person skilled in the art a plan for implementing at least an exemplary embodiment of the extrusion head, with it being possible to make numerous changes in the function and design of the extrusion head from the components described in exemplary embodiments of the multi-part perforated plate, without departing from the scope of protection of the attached claims and their legal equivalents.

While these embodiments have been described with emphasis on the embodiments, it should be understood that within the scope of the appended claims, the embodiments might be practiced other than as specifically described herein.

What is claimed is:

1. An extrusion head having a perforated plate of a granulating system, wherein the extrusion head comprises:
   a. a head part;
   b. a perforated plate detachably fastened to the head part, wherein the perforated plate comprises:
      (i) a perforated-plate wear insert;
      (ii) a perforated-plate main body;
      (iii) a central inflow cone;
      (iv) an inflow cone part;
      (v) a plurality of perforated dies;
      (vi) a plurality of nozzle channels arranged in the shape of at least one ring and among the plurality of perforated dies; and
      (vii) at least one corrosion-protected fastener, wherein the at least one corrosion-protected fastener is positioned in a central region of the at least one ring, and further wherein the at least one corrosion-protected fastener includes threaded screws, wherein an inner surface of the perforated-plate wear insert has at least two off-center threaded blind holes into which thread ends of the threaded screws project in a detachably securing manner, wherein screw heads of the threaded screws are covered by a base of the inflow cone part and form a press-fit of the perforated-plate main body on the inner surface of the perforated-plate wear insert, while a central threaded stud of the inflow cone part stands in detachable threaded connection with a central threaded hole of the perforated-plate main body; and
   c. at least one central melt channel located on the head part into which the central inflow cone projects and distributes a melt flow among the plurality of nozzle channels.

2. The extrusion head of claim 1, wherein in each perforated die of the plurality of perforated dies is located in the perforated-plate wear insert.

3. The extrusion head of claim 1, wherein the perforated-plate main body comprises the nozzle channels whose ends on the downstream side are in operative connection with the perforated dies of the perforated-plate wear insert, and wherein the perforated-plate wear insert is detachably fastened to the perforated-plate main body by the at least one corrosion-protected fastener.

4. The extrusion head of claim 1, wherein the perforated-plate wear insert has an outer contact surface with openings of the plurality of perforated dies arranged in the shape of the at least one ring, and has an inner surface which is opposite the outer contact surface in which the at least one corrosion-protected fastener engages.

5. The extrusion head of claim 1, wherein the perforated-plate wear insert has at least one thermal insulation cavity adjacent to the plurality of perforated dies.

6. The extrusion head of claim 1, wherein the perforated-plate wear insert has openings of the plurality of perforated dies arranged in groups on an annulus of an outer contact surface.

7. The extrusion head of claim 1, wherein an outer contact surface of the perforated-plate wear insert has a wear-resistant coating.

8. The extrusion head of claim 7, wherein the wear-resistant coating comprises:
   a. tungsten carbide;
   b. aluminum oxide;
   c. silicon nitride;
   d. boron carbide;
   e. silicon carbide; or
   f. combinations thereof.

9. The extrusion head of claim 1, wherein the perforated-plate wear insert has a thermally insulating, wear-resistant material.

10. The extrusion head of claim 9, wherein the thermally insulating, wear-resistant material comprises a high alloy stainless steel with iron nitride precipitates, aluminum oxide, silicon nitride, boron carbide, or silicon carbide.

11. The extrusion head of claim 1, wherein the perforated-plate main body has a heat-conducting metal.

12. The extrusion head of claim 11, wherein the heat conducting metal is bronze or a low-alloy iron alloy.

13. The extrusion head of claim 1, wherein annular heating channels are located in the perforated-plate main body adjacent and transverse to the plurality of nozzle channels.

14. The extrusion head of claim 1, wherein
   a temperature sensor contacts an inner surface of the perforated-plate wear insert for temperature measurement.

15. The extrusion head of claim 14, wherein the temperature sensor is in the region of the plurality of nozzle channels.

16. A granulating system that is in operative connection with the extrusion head of claim 1.

17. The granulating system of claim 16, comprising an underwater granulator having granulator blades which are in rotating operative connection with a stationary outer contact surface of the perforated-plate wear insert.

* * * * *